H. W. HALES.
TELESCOPE.
APPLICATION FILED SEPT. 20, 1920.
1,427,592.
Patented Aug. 29, 1922.
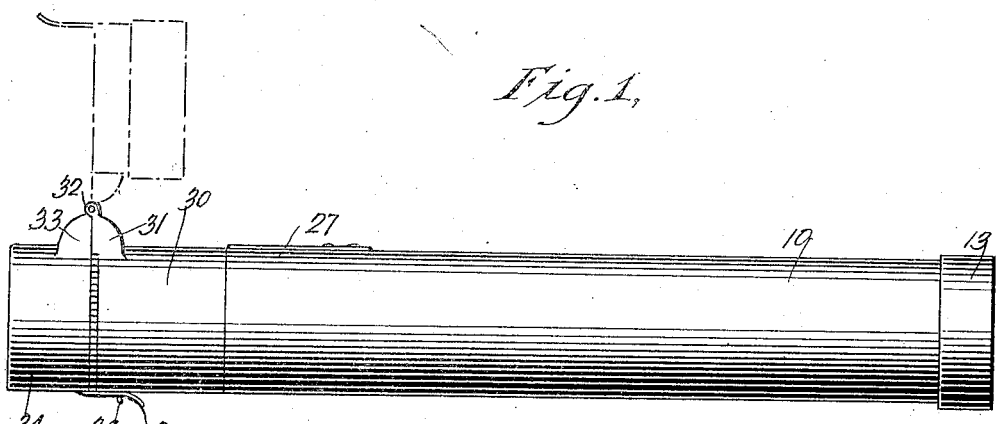
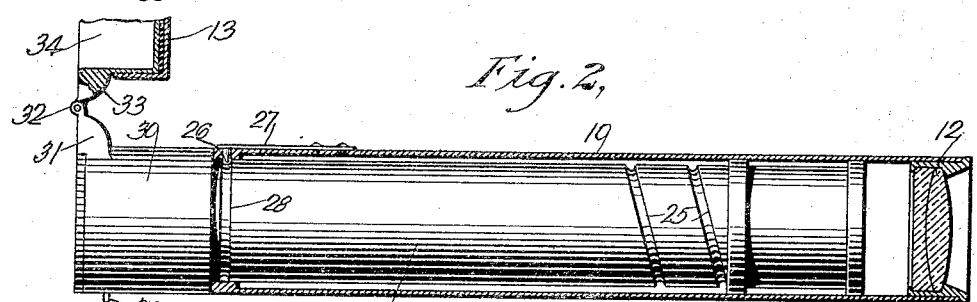
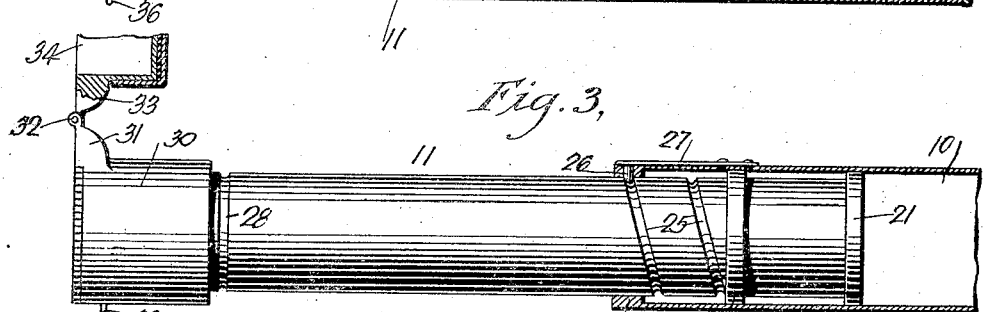
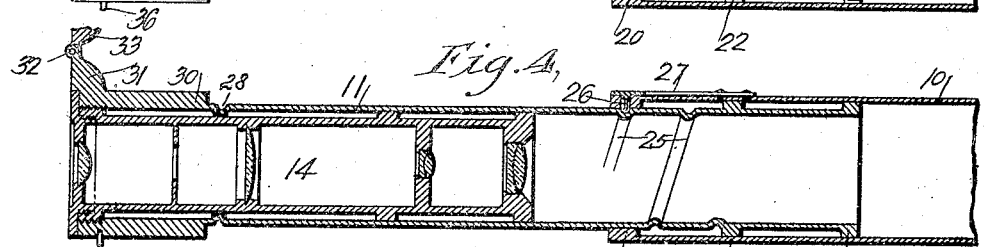
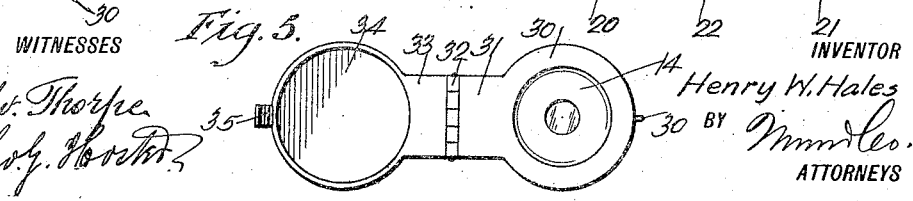
WITNESSES
Edw. Thorpe
Geo. Hooper
INVENTOR
Henry W. Hales
BY
ATTORNEYS

UNITED STATES PATENT OFFICE.

HENRY W. HALES, OF RIDGEWOOD, NEW JERSEY.

TELESCOPE.

1,427,592.      Specification of Letters Patent.      Patented Aug. 29, 1922.

Continuation of application Serial No. 225,200, filed March 28, 1918. This application filed September 20, 1920. Serial No. 411,583.

*To all whom it may concern:*

Be it known that I, HENRY W. HALES, a citizen of the United States, and a resident of Ridgewood, in the county of Bergen and State of New Jersey, have invented a new and Improved Telescope, of which the following is a full, clear, and exact description, this being a continuation of the application for Letters Patent of the United States, Serial No. 225,200, filed by me on March 28, 1918.

The object of this invention is to produce a new and extremely compact telescope for observing distant objects and to obtain all the advantages of the prism binocular without its costliness and defects. It is well known that with the prism binocular system the images of the landscape or seascape stand out in relief with a roundness or stereoscopic effect while the ordinary telescope apparently flattens or compresses the field all into one plane. The ordinary telescope also obliges the observer to squint or use one eye and this produces eye strain to say nothing about the large size and bulk of the instrument. In my invention these difficulties are overcome and an instrument is produced that is extremely light and compact and gives about twice the power of the ordinary telescope size for size. There are no prisms to tarnish or get out of alinement as in the prism binocular and while my invention gives all the plastic effect of the prism binocular, yet it is much lighter in weight, simpler in construction, and of very much higher power.

Another object of the invention is to produce a simple and exceedingly strong construction and one that needs no case or covering for carrying. It is therefore more quickly adjusted and used. For army and navy use and also for sporting purposes an instrument of this kind receives much hard usage, and quickness of handling and adjustment, and a strong, practical construction are absolutely necessary to produce the best results. One difficulty in using all high power glasses heretofore has been to hold them steady enough. This has been largely overcome by my construction as the instrument when used is held steadily against the face and the focusing is done by moving the objective at the farther end. As the instrument is of an extremely short construction this is readily and easily done, and both eyes of the observer being kept wide open it is evident that all eye strain is eliminated.

While I have shown what I consider the most desirable construction, both of the optical and the mechanical parts, it is evident that departure may be made therefrom without detriment to the invention and I do not therefore limit myself to the exact detail herein shown, a wide latitude sometimes being necessary in constructing telescopes for different purposes. The construction shown produces an extremely good, portable instrument for aviation, army, navy and general purposes, and is readily carried in the pocket, or can be slung with a strap if so desired. The outside being entirely smooth there is nothing to catch in the clothing or on nearby moving objects, and its peculiar lightness and strength is of great advantage.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a plan view of the telescope with the parts in closed position;

Figure 2 is a similar view of the same with parts shown in section;

Figure 3 is a similar view of the same with the parts extended;

Figure 4 is a sectional plan view of the same; and

Figure 5 is a front end view of the same.

The telescope in its general construction consists essentially of a tubular objective section 10 and a tubular eyepiece section 11, mounted to slide and to turn in the objective section 10. The outer end of the objective section 10 is provided with an achromatic objective 12 and this outer end is adapted to be closed by a suitable removable cap 13 when the telescope is not in use. In the eyepiece section 11 is mounted an achromatic reversing eyepiece 14 to define the images of the landscape or seascape in relief with a roundness or plastic effect.

The inner end of the objective section 10 is provided with an interior collar 20 forming a bearing for the eyepiece section 11, which latter is provided at its forward end with spaced collars 21 and 22 having bearings on the inner surface of the objective section 10, as plainly indicated in the drawings, thus insuring proper alinement at all times of the sections 10 and 11 especially when the section 11 is drawn out by the user until the desired focus is obtained, but in order to enable the user to manually adjust the sections for obtaining an accurate focus the following arrangement is made: The eyepiece section 11 is provided exteriorly adjacent the collar 22 with an exterior spiral groove 25 adapted to be engaged by a pin 26 held on the free end of a flat spring 27 secured to the rear end of the objective section 10, the pin 26 extending through the collar 20, as plainly indicated in Figure 3. It will be noticed that when the tubular eyepiece section is drawn out into focusing position or nearly so then the pin 26 engages the spiral groove 25, and the user on now turning the tubular sections 10 and 11 one relative to the other causes the section 11 to move inward or outward in the section 10 according to the direction in which the sections are turned one relative to the other. On turning the sections one relative to the other the pin 26 in engagement with the groove 25 insures a slow advance or retraction of the tubular section 11 in the tubular section 10 thus enabling the user to obtain an accurate focus. When the sections 10 and 11 are in closed position then the pin 26 engages an annular groove 28 formed in the forward end of the tubular eyepiece section 11 thus holding the sections 10 and 11 against accidental outward movement one relative to the other.

By reference to the drawings it will be noticed that the pin or stud 26 is rounded off at the end and the spiral groove 25 is in the form of a depression formed in the eyepiece section 11, and the cross section of the groove 25 corresponds to the rounded off end of the pin or stud 26 to allow of jumping the pin or stud out or into the groove 25 on moving the eyepiece section 11 into closed or open position.

It will be noticed that by the arrangement described the eyepiece section 11 can be readily extended or closed irrespective of the action of the pin or stud 26 relative to the groove 25. It will further be noticed that the pin or stud moves readily into active position on extending the eyepiece section 11 to allow minute adjustment for accurate focusing of the telescope.

The rear end of the eyepiece section 11 terminates in an enlargement or a head 30 provided at one side with a lug 31 connected by a hinge 32 with a lug 33 formed on one side of a cap 34 adapted to close the eyepiece 14 during the time the telescope is not in use to protect the eyepiece against dust, the same as the cap 13 is used for protecting the objective 12. The cap 34 when in closed position is locked therein by a spring catch 35 engaging a pin 36 held on the head 30. The cap 34 is adapted to be swung into an open position so that its axis is parallel to the axis of the eyepiece 14, and the cap is such a distance from the eyepiece 14 that when the telescope is used one eye of the user looks through the eyepiece 14 while the other eye looks into the cap 34, and as the latter is preferably blackened on the inside it is evident that the user can keep both eyes open while making observations, one eye being the observing eye at the eyepiece and the other eye being the non-observing eye looking into the cap 34. It is understood that by providing the lugs 31 and 33 the cap 34 is swung far enough to one side so as to be practically central with the non-observing eye. It will be noticed that by the arrangement described the cap 34 not only forms a protector for the eyepiece 14 but also forms a blinder for the non-observing eye of the user of the telescope. The cap 34 is of an exterior diameter corresponding to the interior diameter of the objective cap 13 so that when the latter is removed and the eyepiece cap 34 is in open position then the cap 13 can be slipped onto the cap 34, as plainly shown in Figures 2 and 3, to prevent the cap 13 from being lost and misplaced while the telescope is used. It is understood that when the telescope has been used the cap 13 is removed from the cap 34 and placed at the outer end of the objective section 10 to project the objective 12, while the cap 34 is swung into closed position and locked therein by the catch 35 engaging the pin 36.

Having thus described my invention, I claim as new and desire to secure by Letters Patent:—

A telescope including an objective and eye piece section, a recessed cap provided with a dark lining secured to said eye piece section and normally closing the same to guard against the entry of foreign substances, said recessed cap being adapted when the telescope is in use to be moved to a position at which the same will lie substantially parallel to the end of said eye piece section whereby to act as a blinder for the non-observing eye of the user.

HENRY W. HALES.